United States Patent
Psimas

(10) Patent No.: US 8,579,572 B1
(45) Date of Patent: Nov. 12, 2013

(54) LOAD-RELIEF WASHER ASSEMBLY FOR THREADED FASTENERS

(76) Inventor: Michael James Psimas, Milton, GA (US)

( * ) Notice: Subject to any disclaimer, the term of this patent is extended or adjusted under 35 U.S.C. 154(b) by 0 days.

(21) Appl. No.: 13/555,214

(22) Filed: Jul. 23, 2012

(51) Int. Cl.
*F16B 43/00* (2006.01)

(52) U.S. Cl.
USPC .............................................. 411/535; 411/7

(58) Field of Classification Search
USPC ............. 411/7, 190, 197, 204, 205, 227, 326, 411/330, 368, 371.2, 535, 538, 539, 541, 411/953
See application file for complete search history.

(56) References Cited

U.S. PATENT DOCUMENTS

| | | | |
|---|---|---|---|
| 3,241,589 A * | 3/1966 | Enders | 411/136 |
| 3,273,443 A * | 9/1966 | Rubin | 411/7 |
| 3,329,190 A * | 7/1967 | Oldenkott | 411/136 |
| 3,618,994 A | 11/1971 | Gepfert | |
| 4,338,037 A | 7/1982 | Deminski | |
| 4,622,730 A | 11/1986 | Steinbock | |
| 4,998,453 A | 3/1991 | Walton | |
| 5,190,423 A * | 3/1993 | Ewing | 411/134 |
| 5,203,656 A * | 4/1993 | McKinlay | 411/149 |
| 5,314,279 A * | 5/1994 | Ewing | 411/134 |
| 5,527,015 A | 6/1996 | Percival-Smith | |
| 7,168,902 B2 * | 1/2007 | Terry | 411/160 |
| 7,673,849 B2 | 3/2010 | Britton | |
| 8,206,072 B2 | 6/2012 | Wagner | |
| 2009/0142155 A1* | 6/2009 | Su | 411/7 |
| 2010/0135748 A1* | 6/2010 | Bucknell et al. | 411/535 |

* cited by examiner

*Primary Examiner* — Roberta Delisle

(57) ABSTRACT

A load relief washer assembly for threaded fasteners comprises a lower washer piece, an upper washer piece, a plurality of complementary stepped features which further comprise the mating surfaces of the lower washer and the upper washer, such that sufficient rotation of the upper body relative to the lower body aligns the complementary stepped features allowing the upper body and the lower body to move toward each other, thereby reducing the overall height of the load relief washer assembly.

10 Claims, 32 Drawing Sheets

SECTION A-A

SECTION B-B

LOAD-RELIEF WASHER ASSEMBLY FOR THREADED FASTENERS

FIELD OF THE INVENTION

The present invention relates to a load-relief washer for threaded fasteners. More specifically, the present invention relates to the use of a multiple part washer with complimentary stepped or castellated features to selectively eliminate the tensile load in a bolt or stud.

BACKGROUND OF THE INVENTION

Galling is a common complication that arises when fastening or disassembling threaded components. Galling can result in damage to the threaded features or seizing of said components. Such damage or seizing can often be costly to repair or remedy. Galling is a form of adhesive wear and material transfer between metallic surfaces during operations in which relative motion of said surfaces is involved. The fastening of threaded components, in which interlocking threaded features are slid past each other under high loads, is an industrial operation which is notably prone or vulnerable to galling. Galling is a major concern in said application because the same features which promote galling, such as material ductility, metal on metal contact, friction, and high compressive loads, are not only present, but are indeed necessary features for operation.

However, galling can also occur at relatively low loads since localized pressure and energy density are greater than their respective macroscopic values. It is these local values which can result in elevated friction, promote material transfer, and induce phase transition. When two metallic surfaces, such as complimentary screw threads, are forced together, the high points or asperities found on each surface are the initial mating points. It is possible for said asperities to penetrate the opposing surface upon application of relative movement, thereby initiating plastic deformation and frictional forces between said surfaces. The induced pressure is highly localized, and the small region upon which the pressure is applied is termed the contact zone. Said pressure elevation yields increased friction heating and adhesive forces, thereby resulting in initiation of material transfer, creation of additional protrusions, and growth of said protrusions. Furthermore, galling is especially likely when disassembling threaded fasteners which have been in service for several years due to additional debris from local oxidation, foreign contaminants, and the breakdown, seepage, and removal of assembly lubricants.

The high ductility of commonly used machine screws can be considered a requisite characteristic for substantial material transfer and galling. Frictional heating is greatly related to the size, shape, and material properties of the plastic zones that surround the penetrating objects. Correspondingly, brittle fractures rarely generate copious amounts of heat due to the small, transitory plastic zones. If the height of the protrusion grows larger than a critical threshold value, it may penetrate the brittle oxide layer of the complimentary mating surface. As a result, said protrusion could cause damage to the ductile bulk material on which the oxide layer originally formed, thus creating a region of plastic flow around said protrusion. Thus, the geometry, loading conditions, and relative motion of the protrusion govern the material flow, contact pressure, and thermal profile during sliding.

In the dynamic sliding contact of nut torqueing, increasing axial compressive force is proportionally equal to a rise in potential energy and thermal energy in the aforementioned localized system. Thus, the high loads and relative rotation associated with the torqueing of threaded nuts onto and off of threaded counterparts are particularly susceptible to galling. Additionally, as the nut is turned further and sliding progresses, additional energy is supplied to the system. Initially, there is limited energy loss in the system (contact zone), since heat conduction away from the contact zone is significantly inhibited by the relatively small cross sectional area for thermal transport, and correspondingly low conductance, on the system boundary. The result is a corresponding increase in energy density and temperature in the contact zone, and said energy accumulation can damage the contact surfaces and alter their plastic behavior. Furthermore, the combination of direct contact and plastically deforming flow fields can result in the constitution of a common plastic zone in which the high energy density, pressure, and temperature promote inter-surface bonding. Generally, this greatly increases apparent adhesion as well as the force needed for further nut advancement or removal. In some cases this can cause seizing of the nut onto the threaded component, and removal of said nut requires time-consuming or destructive techniques such as cutting of the nut or screw. Reducing or eliminating the compressive load between threads greatly reduces the likelihood of galling due to a decrease in localized potential energy and frictional heating in the system.

One possible method of galling prevention is the use of a tensioning system to stretch the bolt before turning the nut off. Examples of such tensioning systems include hydraulic bolt tensioners and hydraulic nuts. However, the use of such systems can be time intensive and often require additional hydraulic machinery to produce the requisite operating pressures. Furthermore, said tensioning methods involve temporarily increasing the compressive load on the bolted component during disassembly, which may be undesirable in some circumstances. Examples of hydraulic tensioning devices can be found in U.S. Pat. Nos. 4,998,453; 5,527,015; and 7,673,849.

Another possible method of galling prevention is the use of a plurality of jackbolts to mechanically tension and unload the main stud or bolt. Contrary to the previously described hydraulic tensioning systems, this method has the advantage of not necessitating an increase of the compressive load on the bolted components during disassembly. However, this method of disassembly can be time intensive since multiple jackbolts must be unloaded for each main stud, often employing an iterative, step-wise unloading scheme. Examples of multiple jackbolt devices can be found in U.S. Pat. Nos. 3,618,994; 4,338,037; and 4,622,730.

An additional method of galling prevention is through the use of non-standard bolts or nuts. For example, U.S. Pat. No. 8,206,072 describes a quick release nut which may be selectively disengaged from the fasteners threads. However, it is often necessary to employ standardized fasteners in order to comply with industry guidelines. Thus, the use of a specialty quick-release nut may be undesirable.

There is therefore a need for a load-relief washer which obviates the aforementioned problems.

OBJECTS OF THE INVENTION

Accordingly, an object of this invention is the prevention of galling threaded features during the disassembly of bolted assemblies by reducing the load on said threaded features prior to disassembly.

Another object of this invention is the reduction of the load on the aforementioned threaded features without a corresponding increase of the axial tensile bolt load.

An additional object of the invention is to increase the speed of disassembly of bolted assemblies by eliminating the need for hydraulic machinery and the slow process of tensioning.

An additional object of the invention is to allow the use of industry standard threaded fasteners such as threaded rods, bolts, studs, or nuts.

Another object of the invention is to increase the speed of the unloading process of bolted assemblies by requiring only a partial rotation of one part of the washer to remove the bolt load.

Other objects and advantages of the present invention will become obvious to the reader upon an understanding of the illustrative embodiments about to be described or will be indicated in the claims, and various advantages not referred to herein will occur to one skilled in the art upon employment of the invention in practice.

BRIEF SUMMARY OF THE INVENTION

To attain these and other objects which will become more apparent as the description proceeds according to one aspect of the present invention, there is provided a load-relief washer for threaded fasteners.

More specifically, in accordance with the present invention, there is provided a load relief washer assembly for threaded fasteners (FIGS. 1 to 13) comprising a lower washer piece (1), an upper washer piece (2), a plurality of complimentary stepped features (4) which comprise the mating surfaces of the lower washer (1) and the upper washer (2), and a plurality of sliding planes (3) created by the interface of the lower washer (1) and the upper washer (2). The lower washer (1) and the upper washer (2) each include a hole (5) in their body through which a main bolt or stud may pass.

There is also provided a load relief washer assembly (FIGS. 14 to 19) combined with a threaded bolt (9) with an integrated bolt head (7) and a threaded nut (8) to clamp two work pieces (6) together. The load relief washer assembly comprises a lower washer piece (1), an upper washer piece (2), a plurality of complimentary stepped features (4) which comprise the mating surfaces of the lower washer (1) and the upper washer (2), and a plurality of sliding planes (3) created by the interface of the lower washer (1) and the upper washer (2). The lower washer (1) and the upper washer (2) each include a hole (5) in their body through which the main bolt (9) passes. The tensile load in the main bolt (9) acts through the top work piece (6) and the nut (8) to compress the lower washer (1) and the upper washer (2) of the load relief washer assembly together.

To activate the load relief washer, the upper washer (2) is rotated relative to the lower washer (1), sliding along the mating surfaces (3). Once enough relative rotation between the lower washer (1) and the upper washer (2) is achieved, the complimentary stepped features (4) align, allowing the lower washer (1) and the upper washer (2) to move toward each other. Said movement creates a gap (10) between the upper washer (2) and the nut (8), thereby reducing the tensile load in the main bolt (9). The reduction of the tensile load in the bolt (9) corresponds to a reduction in the forces on the threaded features of the nut (8) and the main bolt (9); thus, the bolted assembly may be disassembled with minimal risk of galling.

There is also provided another embodiment of the load relief washer assembly (FIGS. 20 to 21) comprising a lower washer piece (11), an upper washer piece (12), sets of four complimentary stepped features (14) which comprise the mating surfaces of the lower washer (11) and the upper washer (12), and a plurality of sliding planes (13) created by the interface of the lower washer (11) and the upper washer (12).

There is provided another embodiment of the load relief washer assembly (FIG. 22) comprising a lower washer piece (15), an upper washer piece (16), 8 sets of complimentary stepped features (18) which comprise the mating surfaces of the lower washer (15) and the upper washer (16), and a plurality of sliding planes (17) created by the interface of the lower washer (15) and the upper washer (16).

There is provided another embodiment of the load relief washer assembly (FIGS. 23 to 25) comprising a lower washer piece (19), an upper washer piece (20) with a dodecagonal feature, a plurality of complimentary stepped features (22) which comprise the mating surfaces of the lower washer (19) and the upper washer (20), and a plurality of sliding planes (21) created by the interface of the lower washer (11) and the upper washer (12).

There is provided another embodiment of the load relief washer assembly (FIGS. 26 to 28) comprising a lower washer piece (23), an upper washer piece (24) with a splined feature (25), a plurality of complimentary stepped features which comprise the mating surfaces of the lower washer (23) and the upper washer (24), and a plurality of sliding planes created by the interface of the lower washer (23) and the upper washer (24).

There is provided another embodiment of the load relief washer assembly (FIGS. 29 to 30) comprising a lower washer piece (26), an upper washer piece (27) with a plurality of transverse holes (28), a plurality of complimentary stepped features which comprise the mating surfaces of the lower washer (26) and the upper washer (27), and a plurality of sliding planes created by the interface of the lower washer (26) and the upper washer (27).

There is also provided an embodiment with multiple load relief washer assemblies (FIGS. 31 to 32) combined with threaded bolts (30) and threaded nuts (8) to clamp common flanges (29) together. The load relief washer assemblies each comprise of a lower washer piece (1), an upper washer piece (2), a plurality of complimentary stepped features which comprise the mating surfaces of the lower washer (1) and the upper washer (2), and a plurality of sliding planes created by the interface of the lower washer (1) and the upper washer (2). The lower washer (1) and the upper washer (2) each include a hole in their body through which a main bolt or stud may pass.

Other aspects and advantages will be more readily apparent as the present invention becomes better understood by reference to the following detailed description and considered in connection with the accompanying drawings in which like reference symbols designate like elements throughout the figures.

The features of the present invention which are believed to be novel are set forth with particularity in the appended claims.

DETAILED DESCRIPTION OF THE INVENTION

Figure 1:
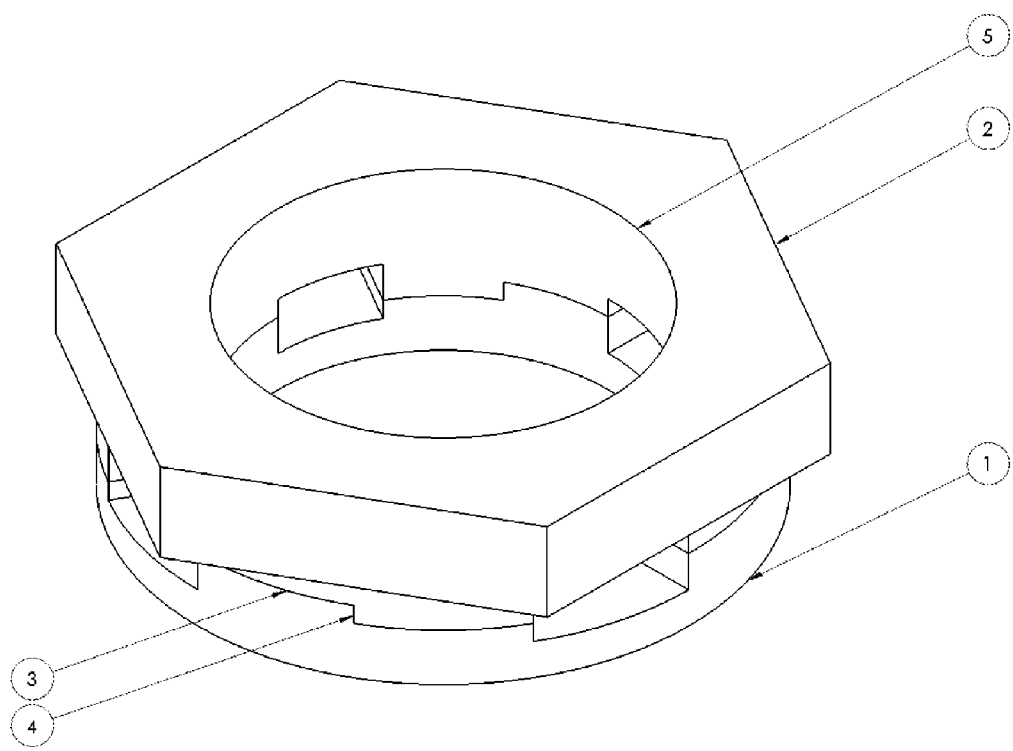
FIG. 1 is a top isometric view showing the load relief washer assembly according to an embodiment of the present invention.
Figure 2:
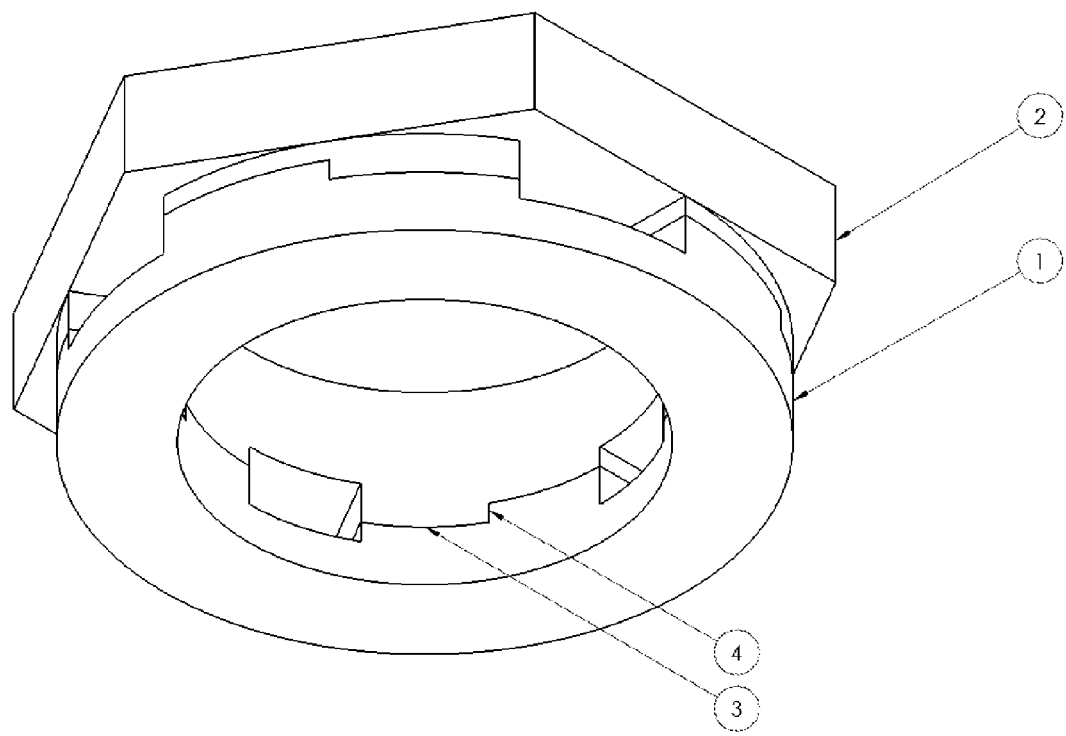
FIG. 2 is a bottom isometric view of FIG. 1 showing the stepped features.
Figure 3:
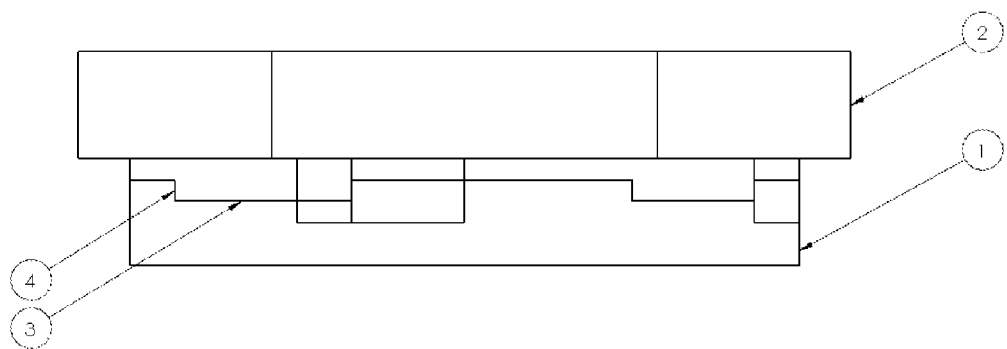
FIG. 3 is a side view of FIG. 1 showing the alignment of various parts.
Figure 4:
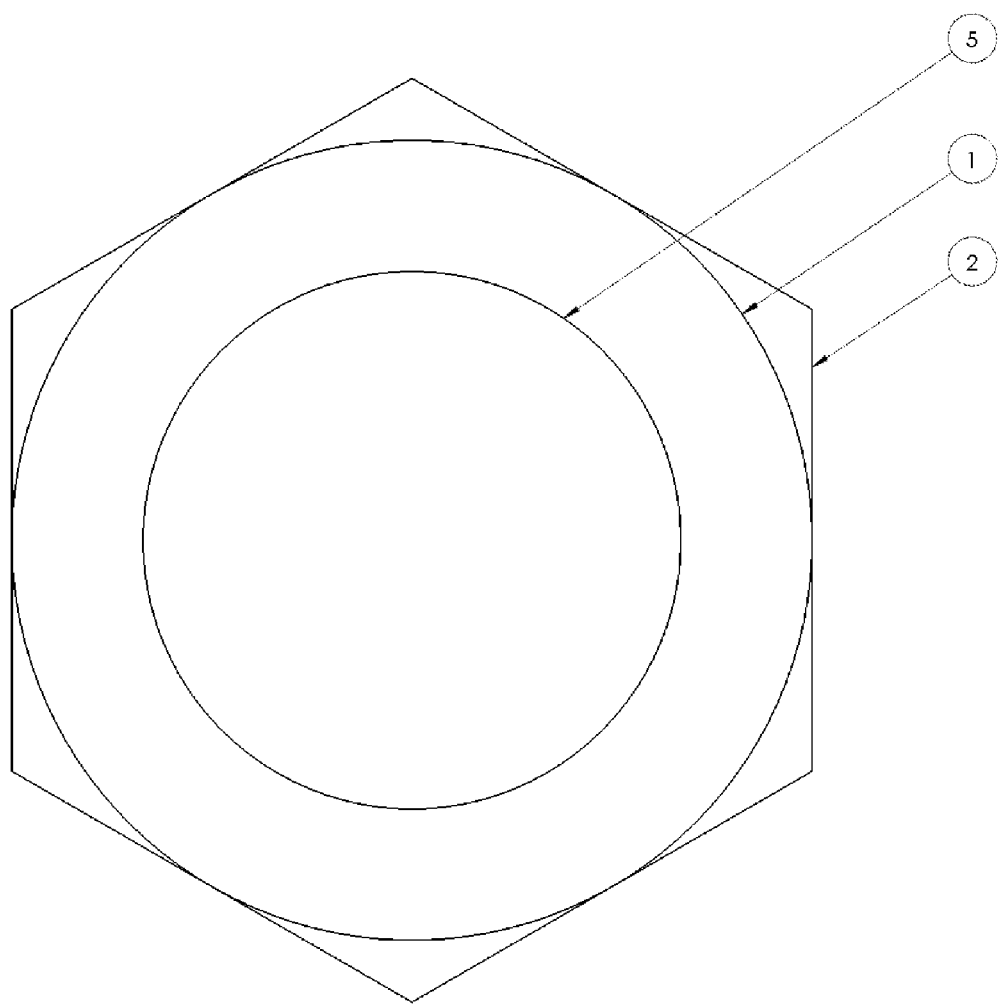
FIG. 4 is a bottom view of FIG. 1 showing the hole through which the main stud or bolt may pass.
Figure 5:
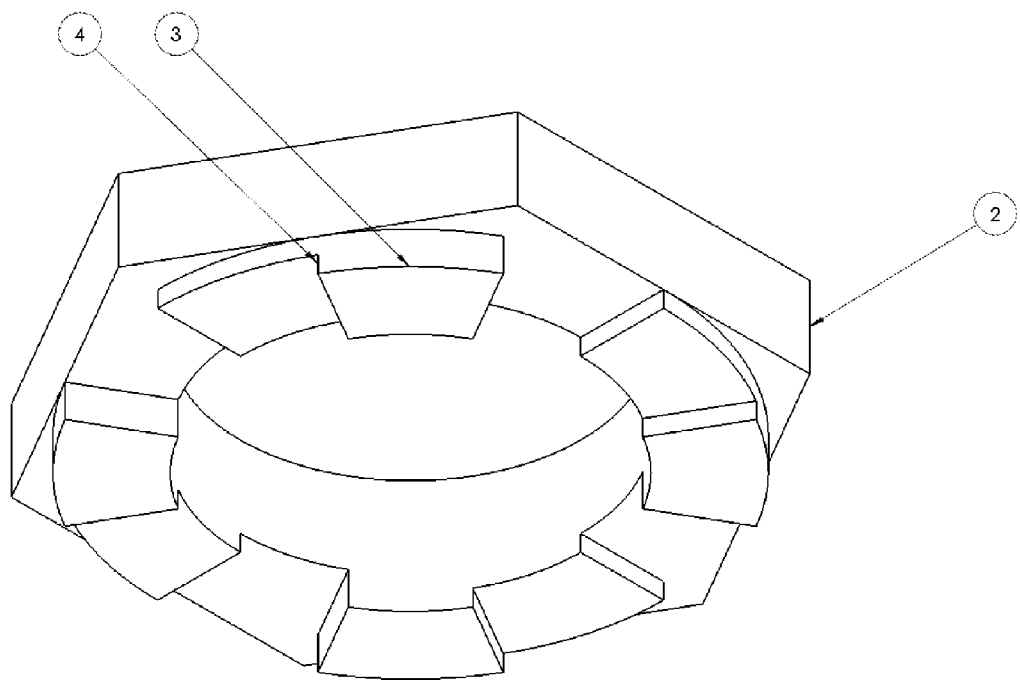
FIG. 5 is a bottom isometric view of FIG. 1 with the bottom washer removed showing the top washer.
Figure 6:
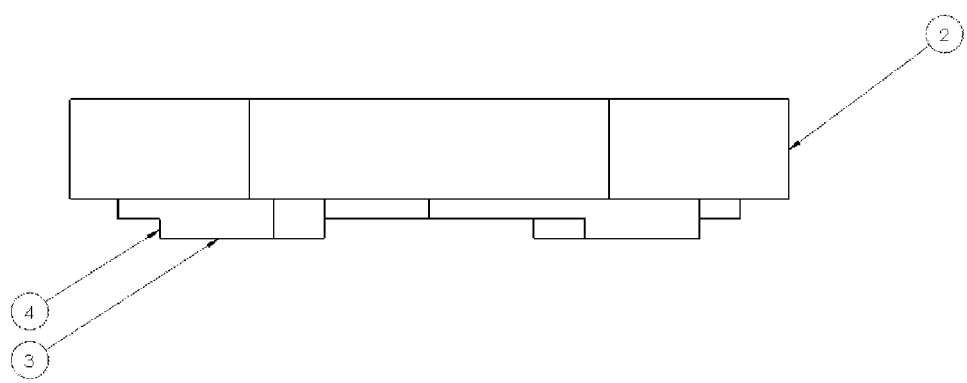
FIG. 6 is a side view of FIG. 1 with the bottom washer removed showing the stepped features of the top washer.
Figure 7:
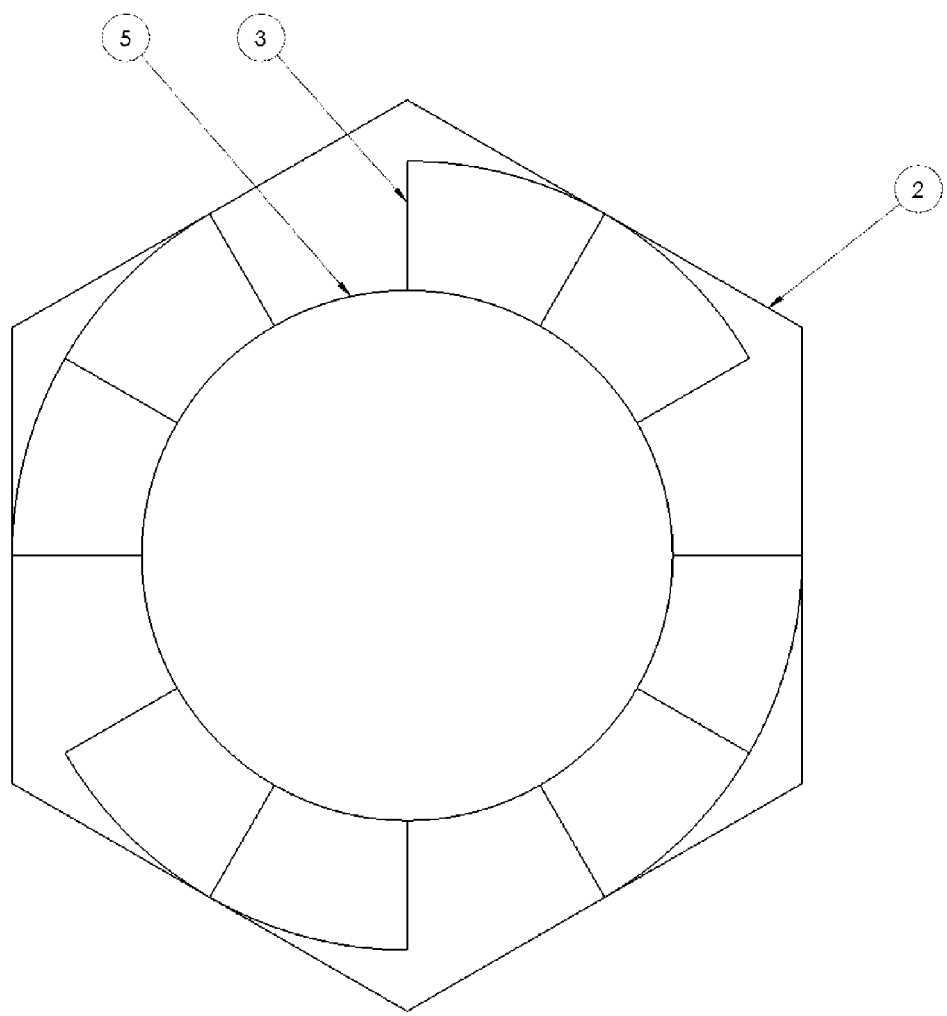
FIG. 7 is a bottom view of FIG. 1 with the bottom washer removed showing the layout of the top washer.
Figure 8:
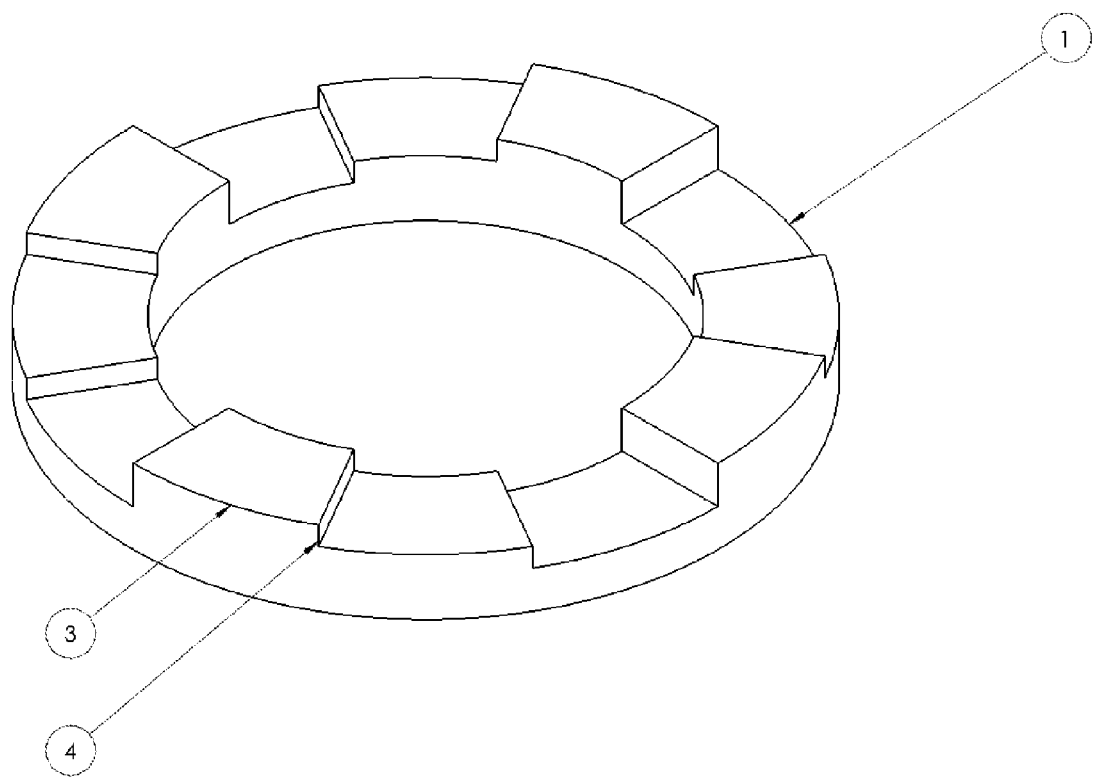
FIG. 8 is a top isometric view of FIG. 1 with the top washer removed showing the bottom washer.
Figure 9:
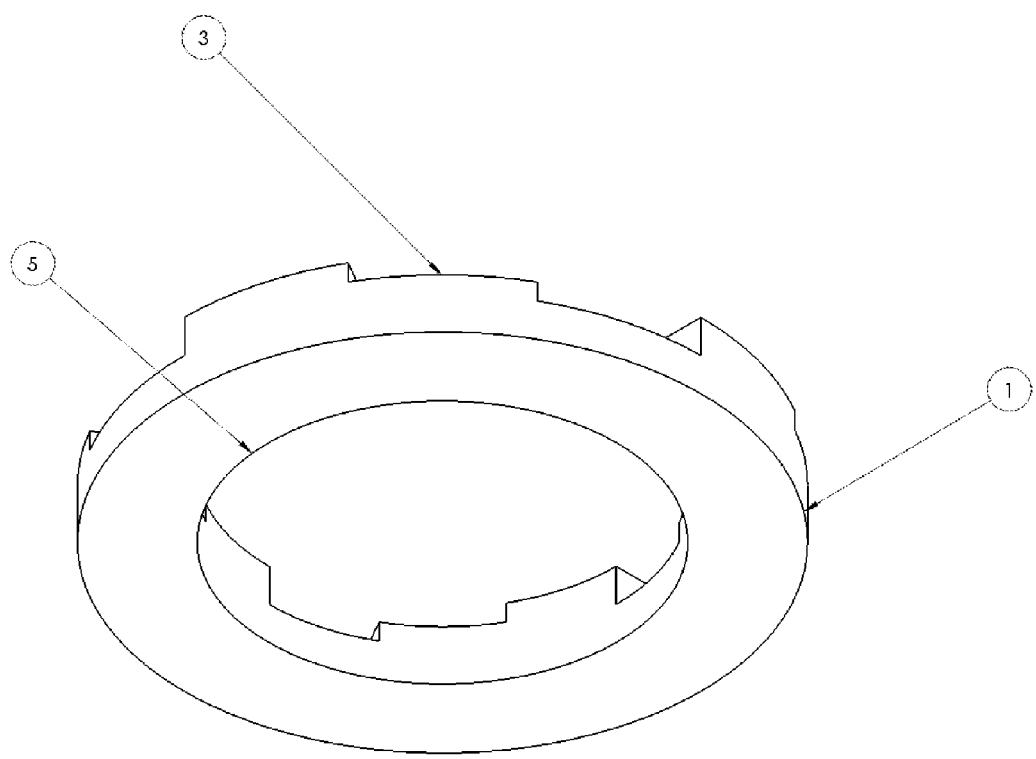
FIG. 9 is a bottom isometric view of FIG. 1 with the top washer removed showing the flat surface of the bottom washer.
Figure 10:
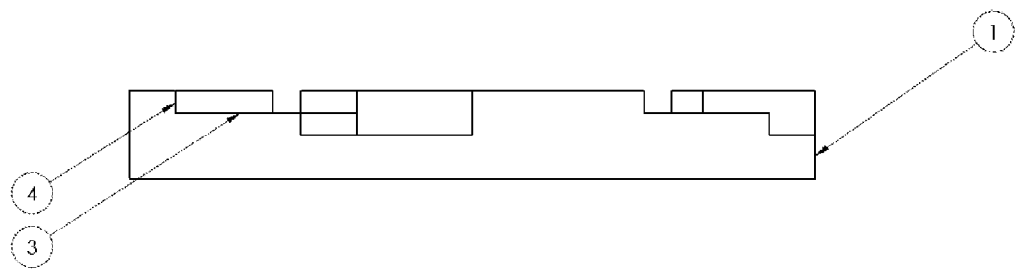
FIG. 10 is a side view of FIG. 1 with the top washer removed showing the stepped features of the bottom washer.
Figure 11:
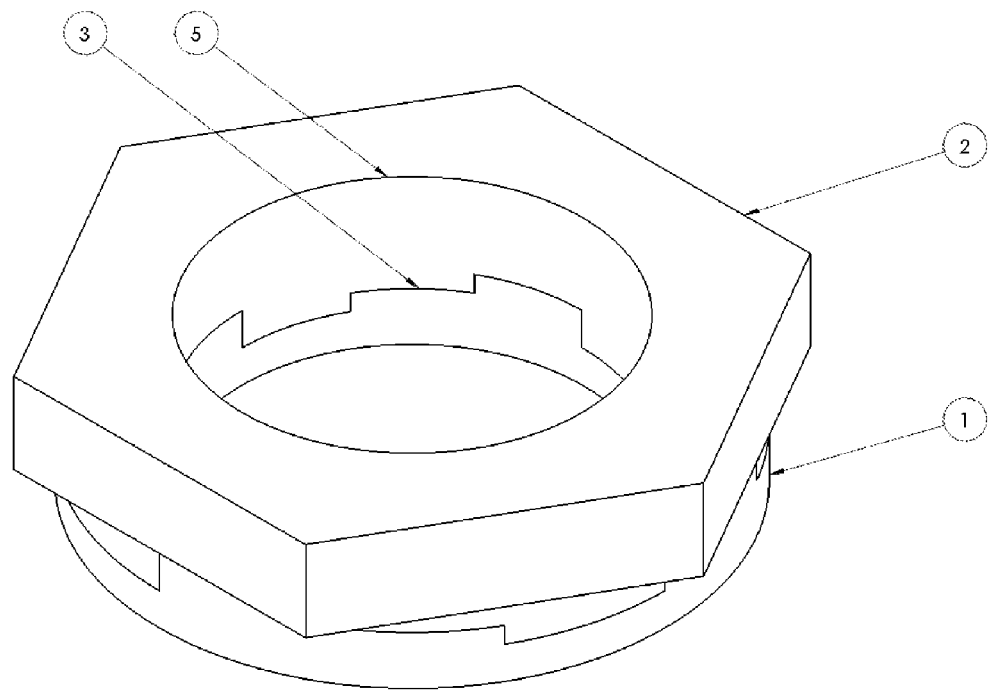
FIG. 11 is a top isometric view showing the load relief washer assembly in the activated position according to an embodiment of the present invention.
Figure 12:
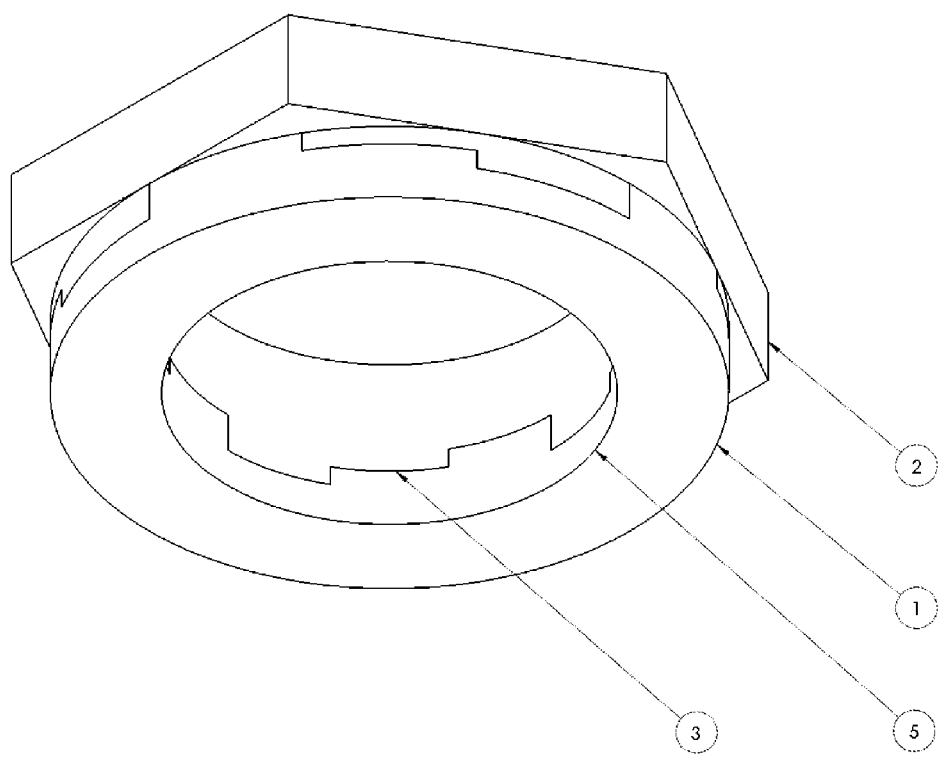
FIG. 12 is a bottom isometric view of FIG. 11 showing the stepped features.
Figure 13:
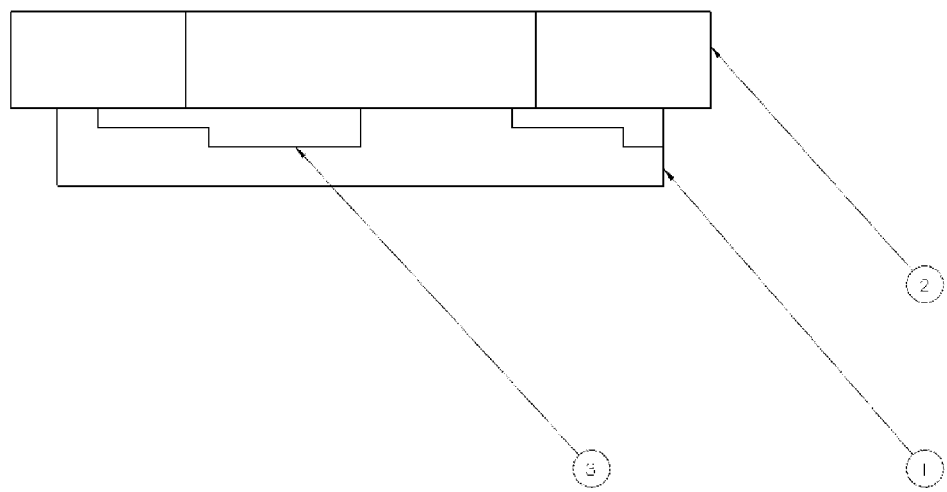
FIG. 13 is a side view of FIG. 11 showing the alignment of various parts.
Figure 14:
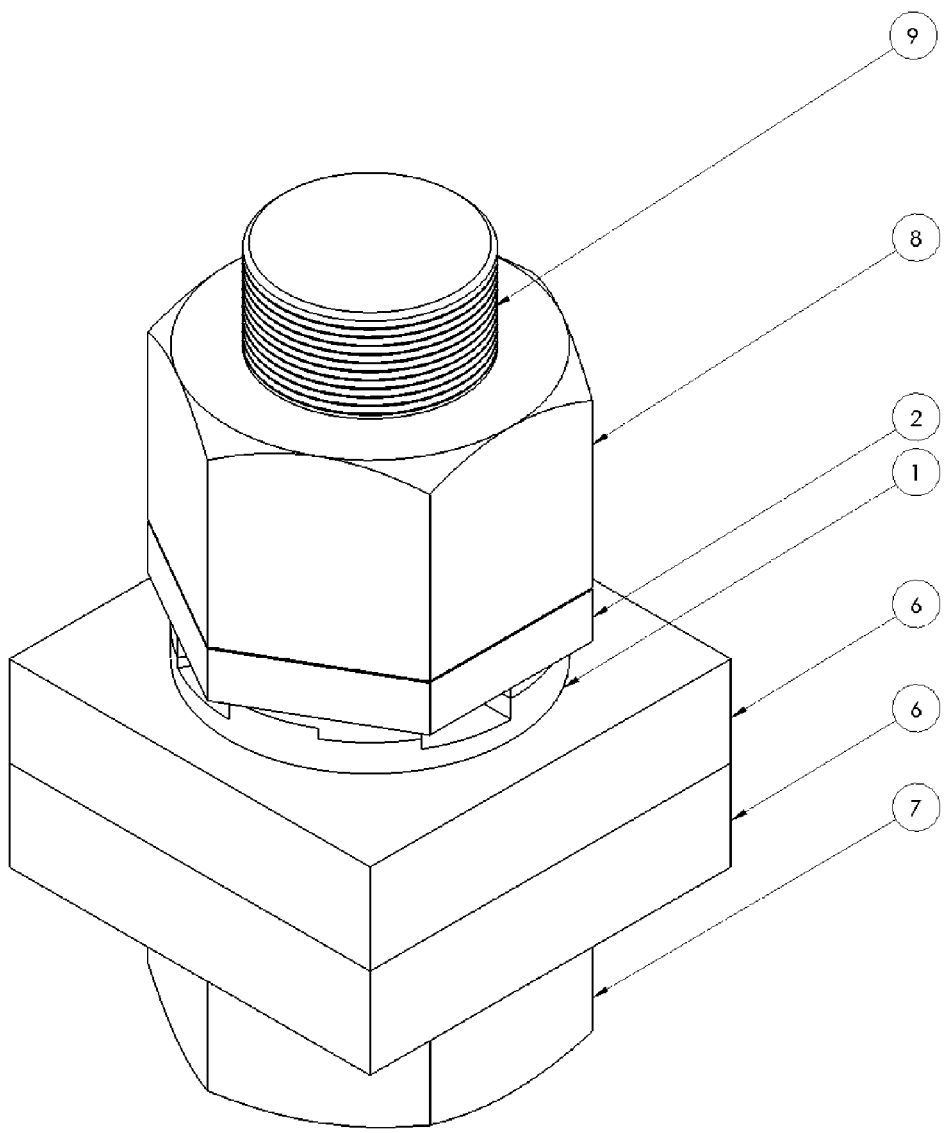
FIG. 14 is an isometric view of a load relief washer with a bolted assembly including a headed bolt, a nut, and two clamped work pieces.
Figure 15:
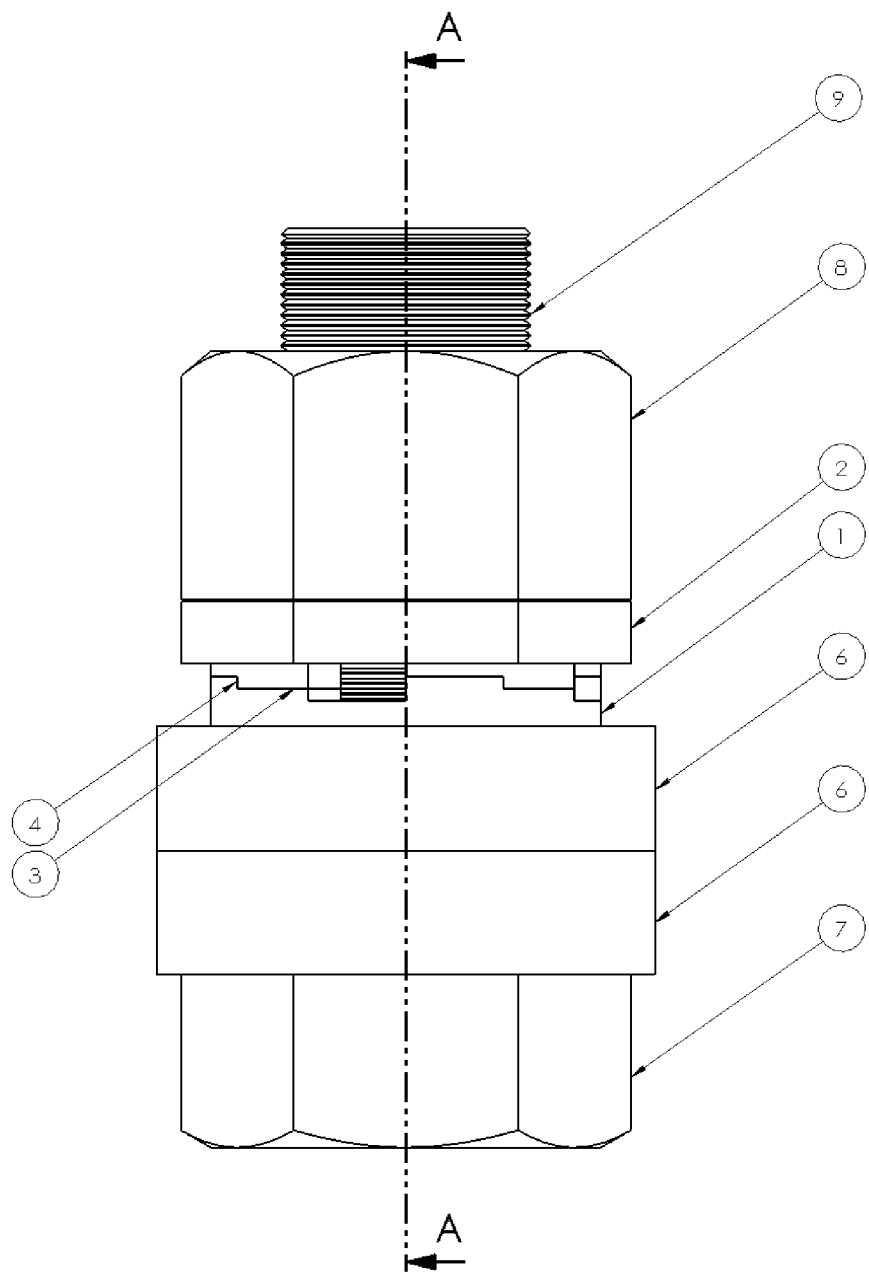
FIG. 15 is a side view of FIG. 14 showing a load relief washer with a bolted assembly including a headed bolt, a nut, and two clamped work pieces.
Figure 16:
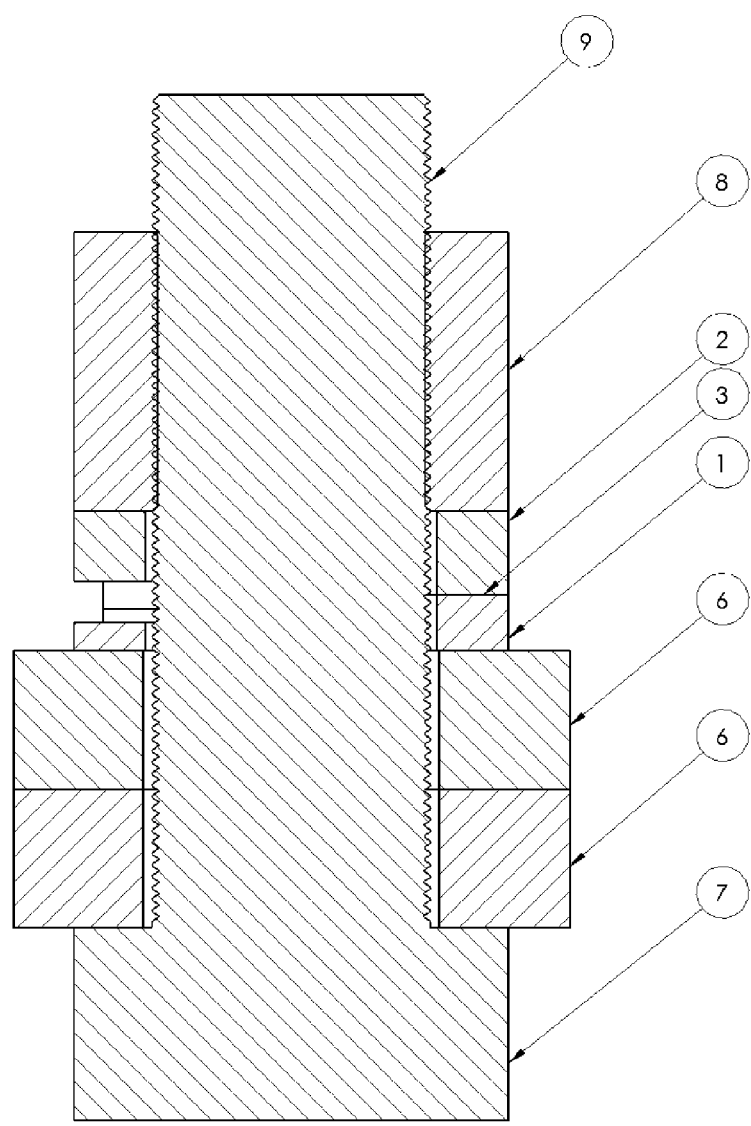
FIG. 16 is a full section view of FIG. 14 showing a load relief washer with a bolted assembly including a headed bolt, a nut, and two clamped work pieces.
Figure 17:
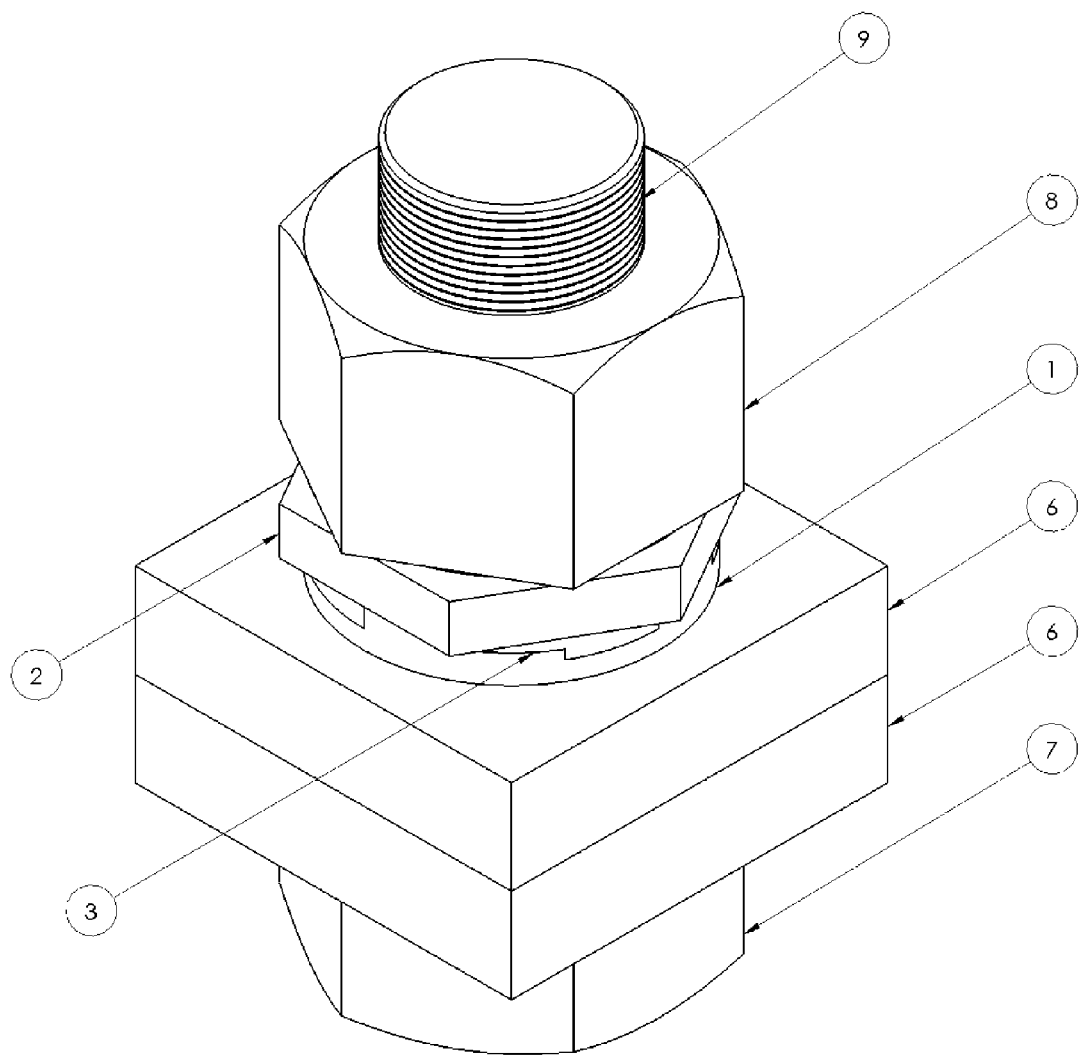
FIG. 17 is an isometric view of an activated load relief washer with a bolted assembly including a headed bolt, a nut, and two work pieces.
Figure 18:
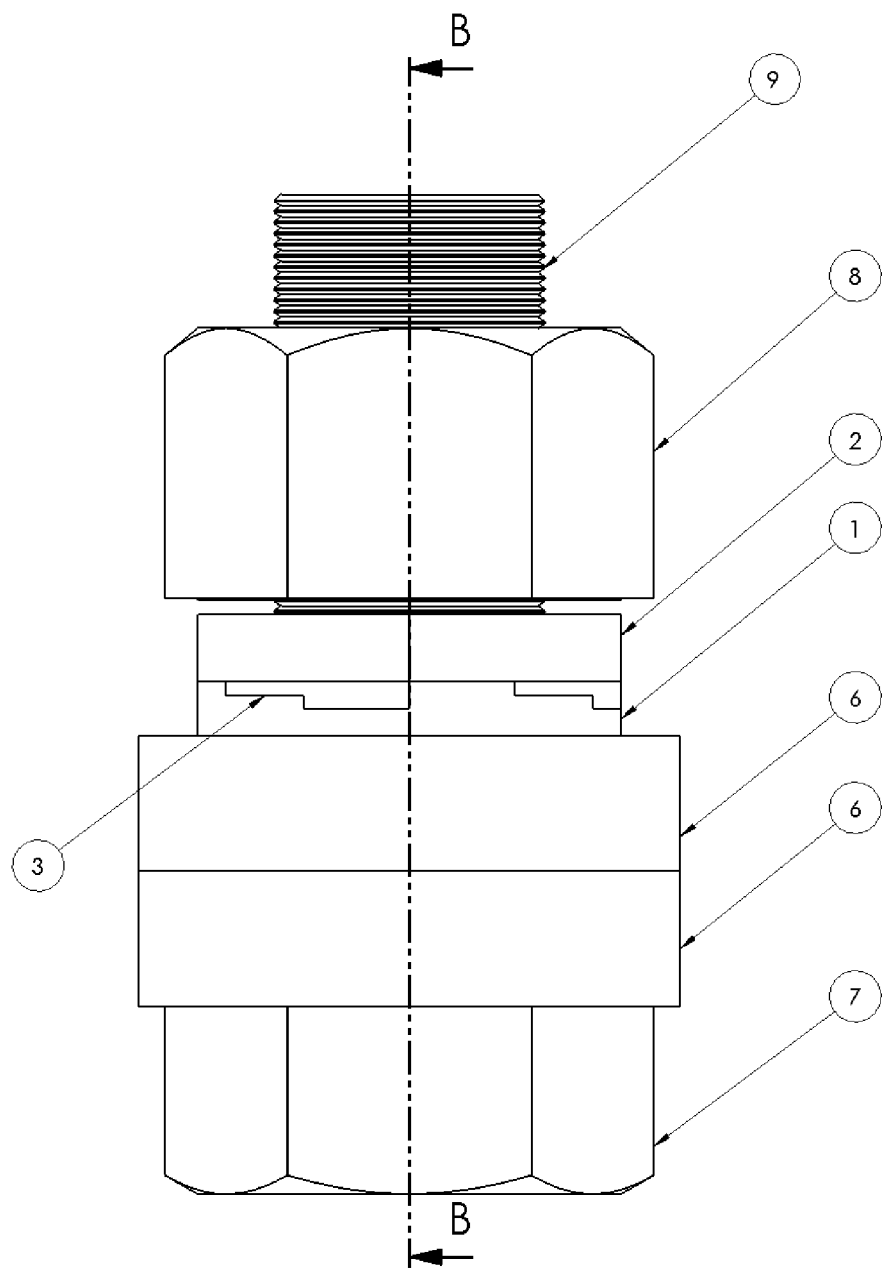
FIG. 18 is a side view of FIG. 17 showing an activated load relief washer with a headed bolt, a nut, two clamped work pieces, and a gap between the nut and top washer.
Figure 19:
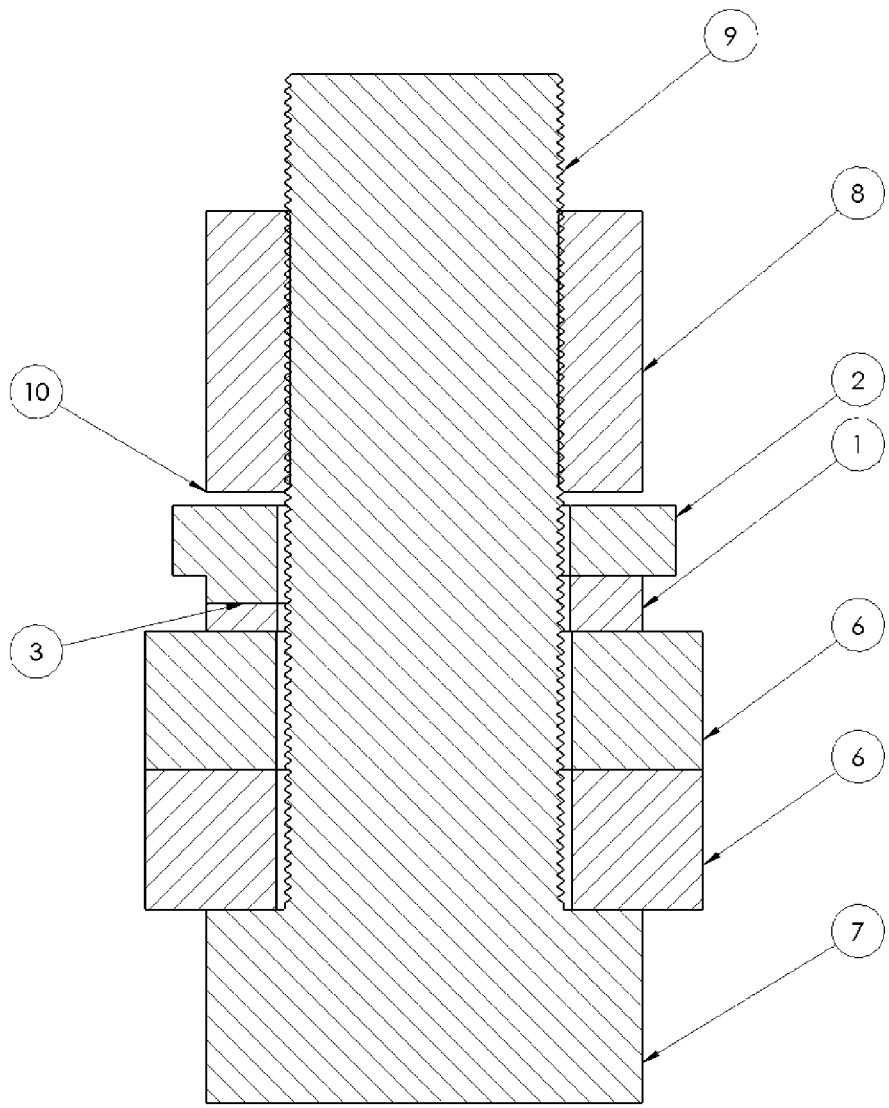
FIG. 19 is a full section view of FIG. 17 showing an activated load relief washer with a bolted assembly and a gap between the nut and top washer.

With reference to the annexed figures, the preferred embodiments of the present invention will be herein described for indicative purposes and by no means represent limitations.

The figures and description attached to it are only intended to illustrate the idea of the invention. As to the details, the invention may vary within the scope of the claims. So, the size and shape of the tension relief system may be chosen to best fit the fastened assembly.

Also, as used hereinabove and hereinafter, the term "stud" generally refers to stud, bolt, rod and other similarly shaped fasteners used in securing assemblies.

In accordance with the present invention, there is provided a load relief washer assembly for threaded fasteners (FIGS. 1 to 19) comprising a lower washer piece (1), an upper washer piece (2), a plurality of complimentary stepped features (4) which comprise the mating surfaces of the lower washer (1) and the upper washer (2), and a plurality of sliding planes (3) created by the interface of the lower washer (1) and the upper washer (2). The lower washer (1) and the upper washer (2) each include a hole (5) in their body through which a main bolt or stud may pass.

A first embodiment of the present invention is best shown in FIGS. 1 to 3 and FIGS. 13 to 19. Its components comprise a lower washer piece (1), an upper washer piece (2), a plurality of complimentary stepped features (4) which comprise the mating surfaces of the lower washer (1) and the upper washer (2), and a plurality of sliding planes (3) created by the interface of the lower washer (1) and the upper washer (2). A threaded bolt (9) passes through holes (5) in the bodies of the lower washer (1) and the upper washer (2) and mates with a threaded nut (8) to clamp two work pieces (6) together. The stud (9) can pass through holes in the two work pieces (6) wherein the stud (9) can have an integral hex head (7) (see FIGS. 14 to 19) to allow it to be turned into place using external means, such as a hex socket. Alternatively, the stud can pass through holes in the two work pieces (6) and thread into a standard nut under the bottom work piece (6), or the stud (9) can be threaded into the bottom work piece (6).

The tensile load in the main bolt (9) clamps the load relief washer assembly and the work pieces (6) together, thereby making the load relief washer part of the bolted assembly. The nut (8) bears down on the upper washer (2), and the top work piece (6) similarly compresses the lower washer (1). However, relative movement of the upper washer (2) and the lower washer (1) towards each other is inhibited by their raised, stepped features (4); thus, the tensile load in the main bolt (9) is transferred to the plurality of sliding planes (3) created by the interface of the lower washer (1) and the upper washer (2).

To activate the load relief washer, the upper washer (2) is rotated relative to the lower washer (1), sliding along the mating surfaces (3). In this example, a hexagonal shaped feature is included to aid in achieving said rotation though external means, such as a hex socket. Once enough relative rotation between the lower washer (1) and the upper washer (2) is achieved, the complimentary stepped features (4) align, allowing the lower washer (1) and the upper washer (2) to move toward each other. As the overall thickness of the bolted assembly is reduced, bolt stretch of the main stud (9) is alleviated and the tensile load lessens. If necessary, the height of the bolted assembly can be reduced past the point of removing stretch of the main stud (9), thereby creating a gap (10) between the upper washer (2) and the nut (8). The reduction of the tensile load in the bolt (9) corresponds to a reduction in the forces on the threaded features of the nut (8) and the main bolt (9); thus, the bolted assembly may be disassembled with minimal risk of galling.

It is to be understood that even though a stud (9) with an integral head (7) has been shown, the use of other types of studs and other types of mating techniques between the studs and work pieces (6) are also contemplated. For example, the mating of the stud (9) with the lower work piece (6) could be effected with a normal threaded nut which is threaded on a stud until it abuts on and mates with the lower work piece (6). Therefore, the present invention is not limited to a particular mating technique between the stud (9) and work pieces (6).

Figure 31:
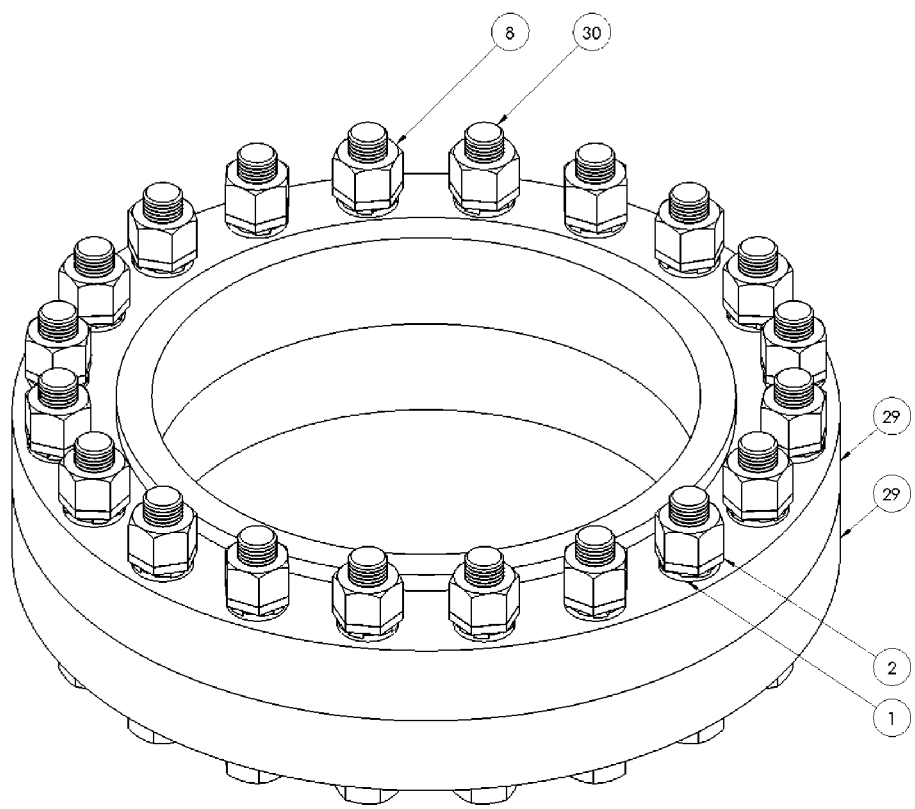
FIG. 31 is an isometric view of multiple load relief washers with a bolted assembly including headed bolts, nuts, and two clamped circular flanges.
Figure 32:
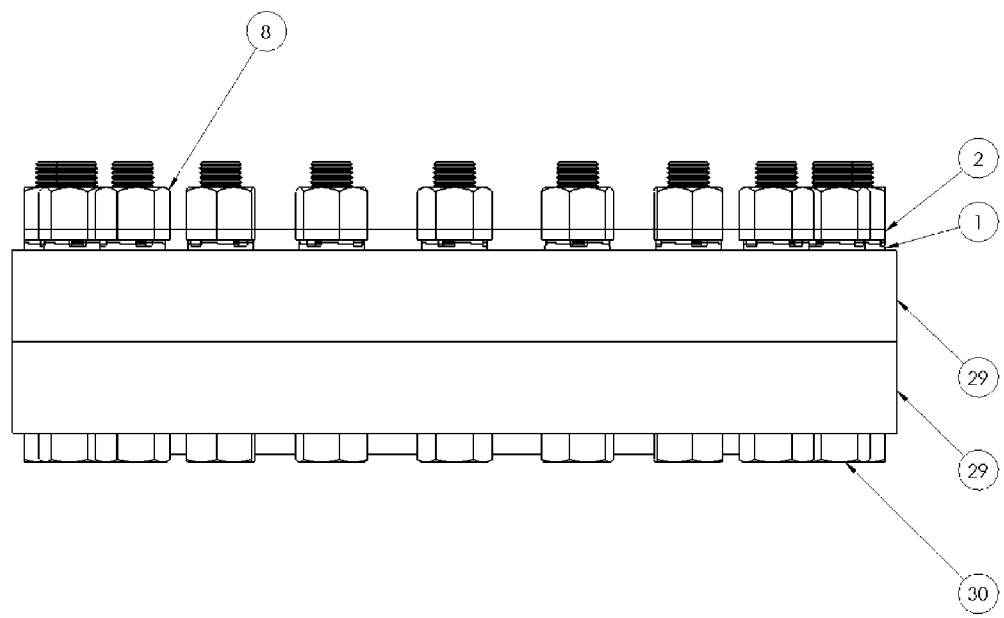
FIG. 32 is a side view of FIG. 31 showing multiple load relief washers with a bolted assembly including headed bolts, nuts, and two clamped circular flanges.

In another embodiment, multiple instances of the present invention are shown installed on the face of a circular flange (FIGS. 31 to 32). The stud bolts (30) are inserted through the lower washers (1), upper washers (2), threaded nuts (8), and the corresponding flanges (29) that are mating together.

Figure 20:
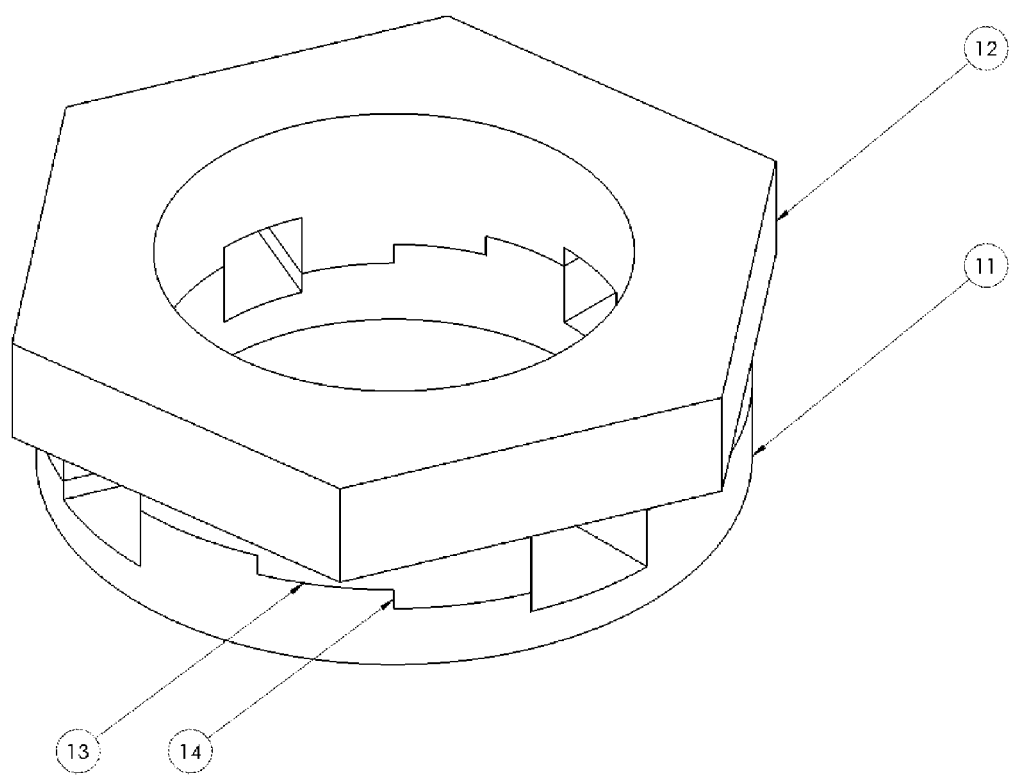
FIG. 20 is a top isometric view showing a load relief washer assembly according to an embodiment of the present invention with three step levels.
Figure 21:
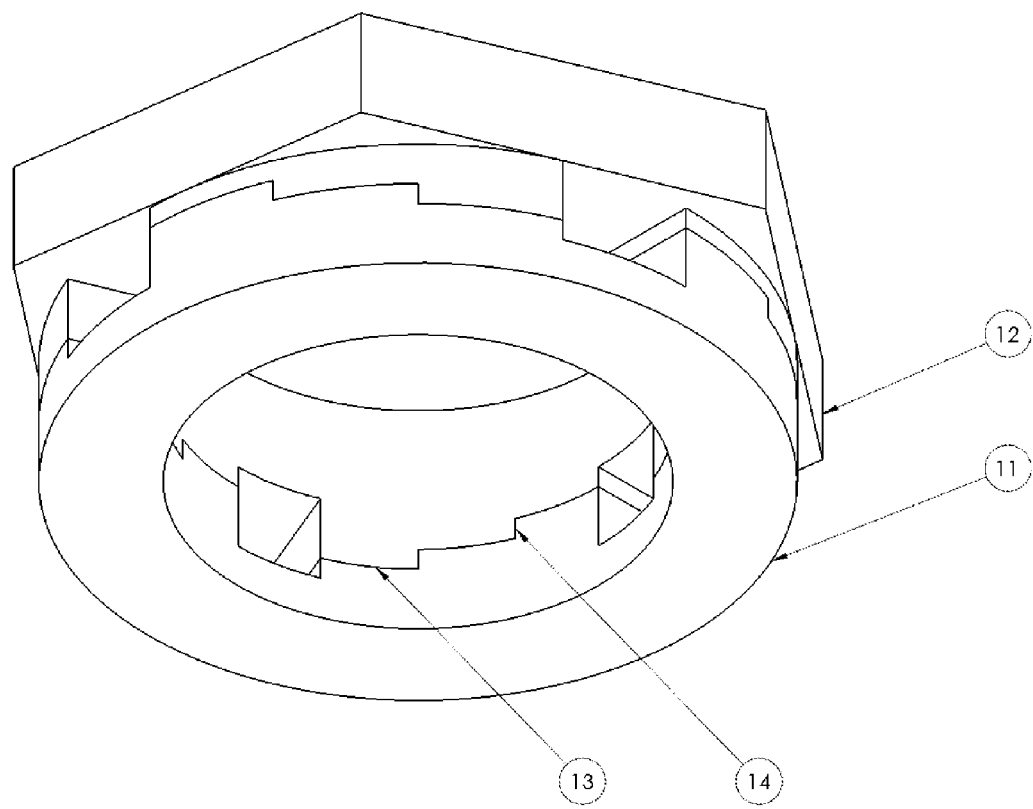
FIG. 21 is a bottom isometric view of FIG. 20 showing a load relief washer assembly with three step levels.

There is provided another embodiment of the load relief washer assembly (FIGS. 20 to 21) comprising a lower washer piece (11), an upper washer piece (12), sets of four complimentary stepped features (14) which comprise the mating surfaces of the lower washer (11) and the upper washer (12), and a plurality of sliding planes (13) created by the interface of the lower washer (11) and the upper washer (12). The greater number of stepped features (14) allows activation to be achieved with less rotation of the lower washer (11) and the upper washer (12).

Figure 22:
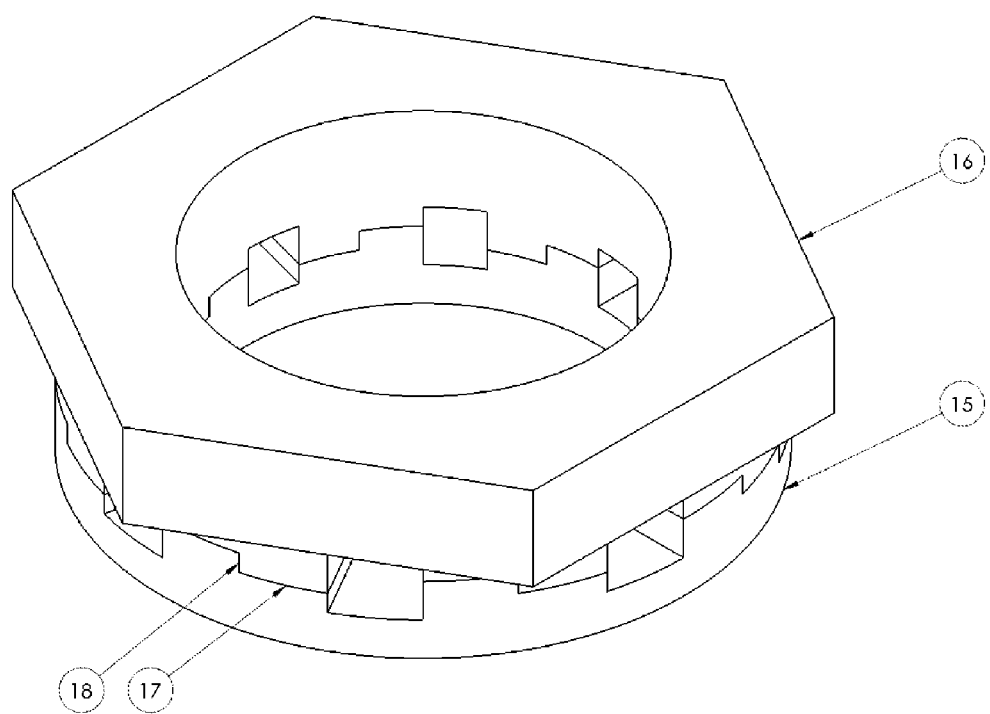
FIG. 22 is an isometric view showing a load relief washer assembly according to an embodiment of the present invention with 8 sets of stepped features.

There is provided another embodiment of the load relief washer assembly (FIG. 22) comprising a lower washer piece (15), an upper washer piece (16), 8 sets of complimentary stepped features (18) which comprise the mating surfaces of the lower washer (15) and the upper washer (16), and a plurality of sliding planes (17) created by the interface of the lower washer (15) and the upper washer (16). The greater number of sets of complimentary stepped features (18) allows activation to be achieved with less rotation of the lower washer (15) and the upper washer (16) and can change the load distribution.

Also, it is to be understood that even though select step-like features have been shown, the use of other types and shapes of the steps (4) are also contemplated. For example, said features could be castellated, slightly angled, or linear rather than annular. Therefore, the present invention is not limited to the particular type, shape, or number of the steps (4).

Figure 23:
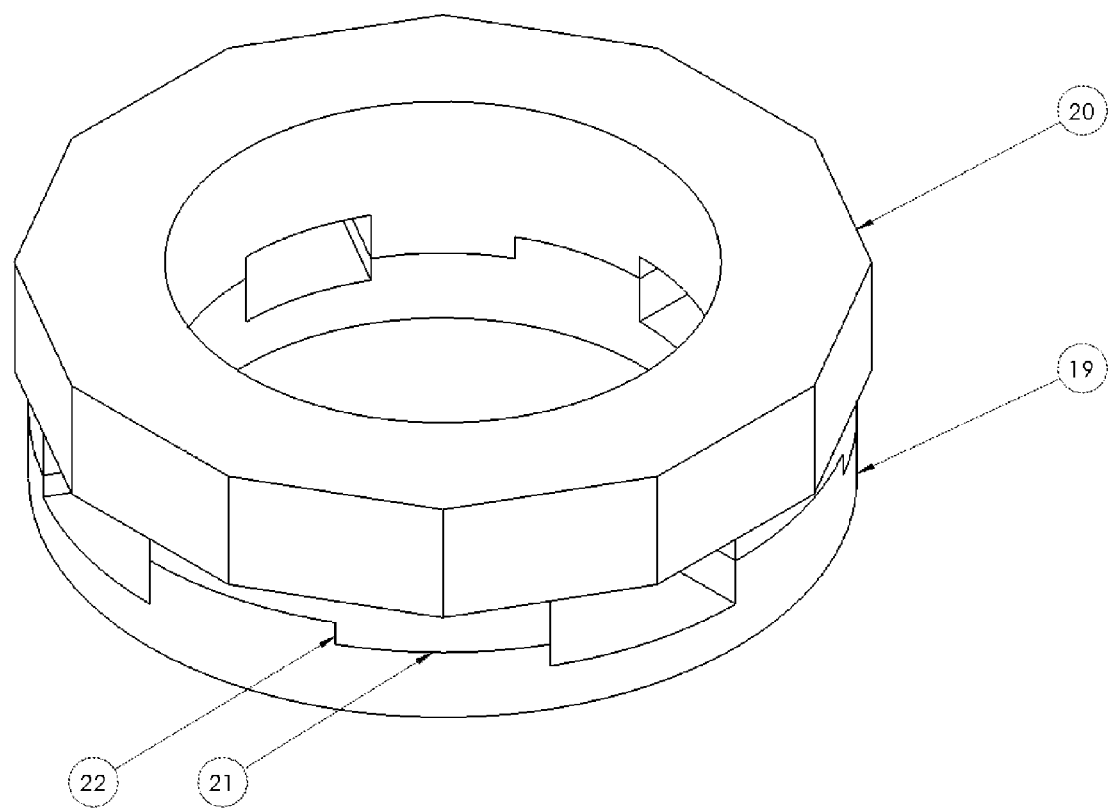
FIG. 23 is a top isometric view showing a load relief washer assembly according to an embodiment of the present invention with a dodecagonal feature on the top washer.
Figure 24:
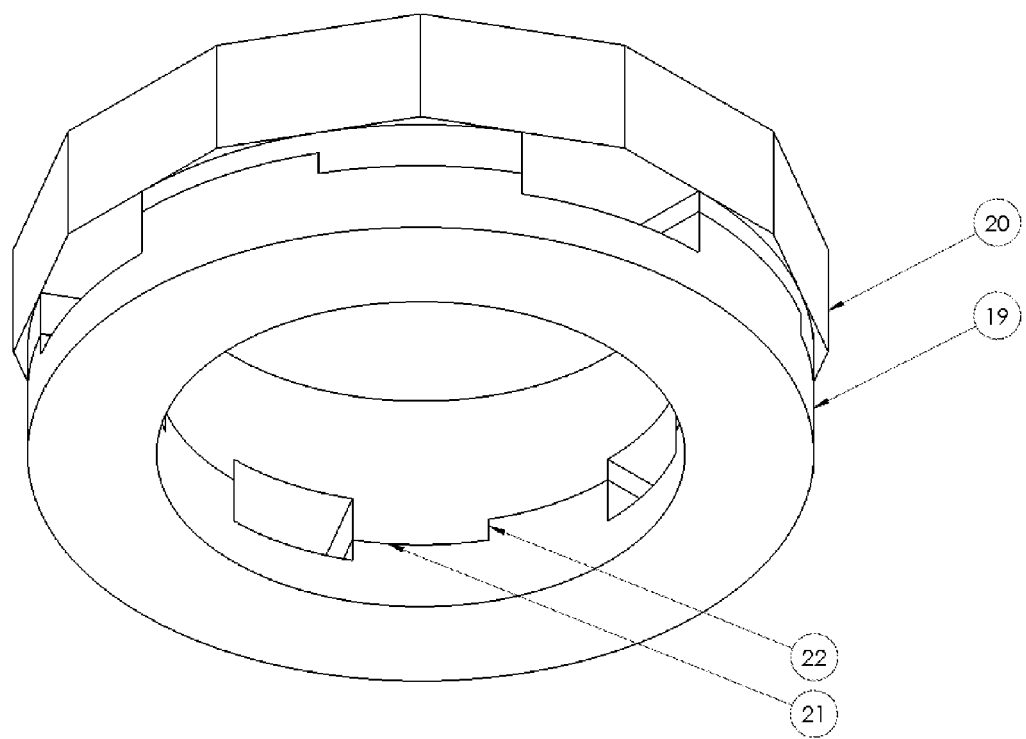
FIG. 24 is a bottom isometric view of FIG. 23 showing a load relief washer assembly with a dodecagonal feature on the top washer.
Figure 25:
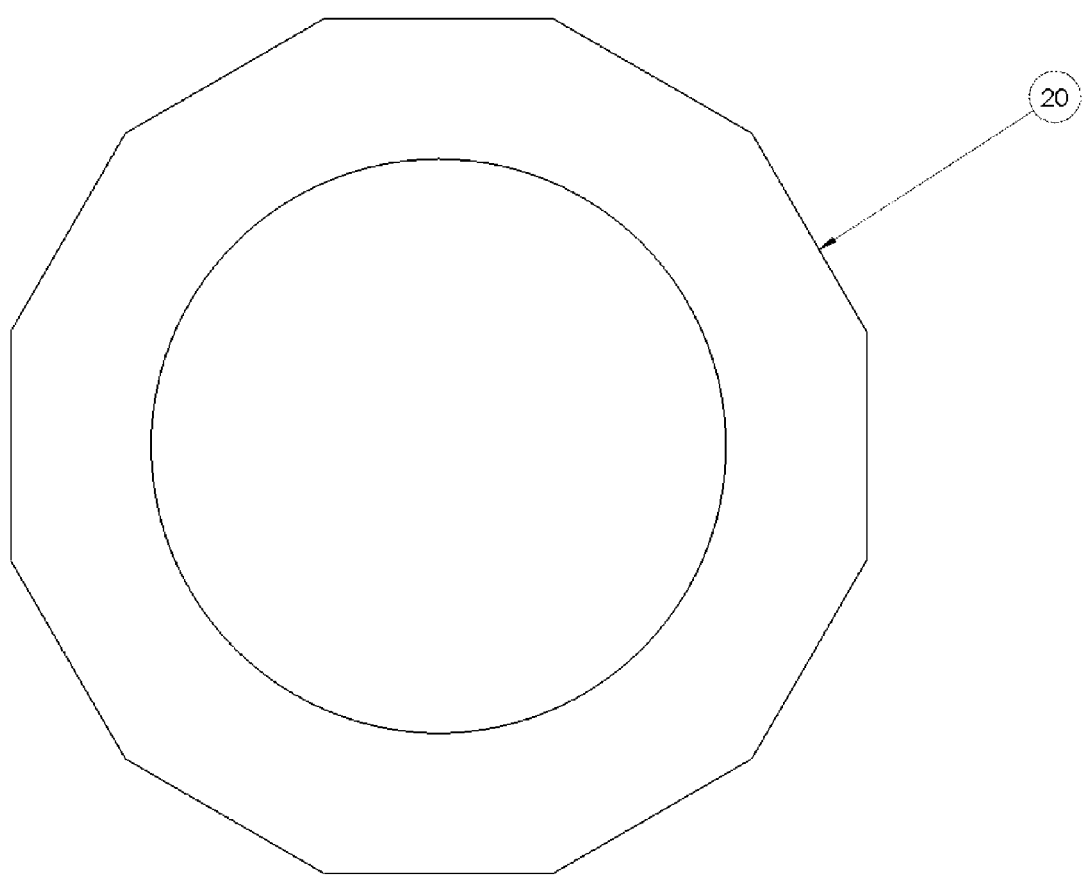
FIG. 25 is a top view of FIG. 23 showing a load relief washer assembly with a dodecagonal feature on the top washer.

There is provided another embodiment of the load relief washer assembly (FIGS. 23 to 25) comprising a lower washer piece (19), an upper washer piece (20) with a dodecagonal feature, a plurality of complimentary stepped features (22) which comprise the mating surfaces of the lower washer (19) and the upper washer (20), and a plurality of sliding planes (21) created by the interface of the lower washer (11) and the upper washer (12). The dodecagonal feature is included to aid in achieving relative rotation of the lower washer (11) and the upper washer (12) though external means, such as a 12-point socket.

Figure 26:
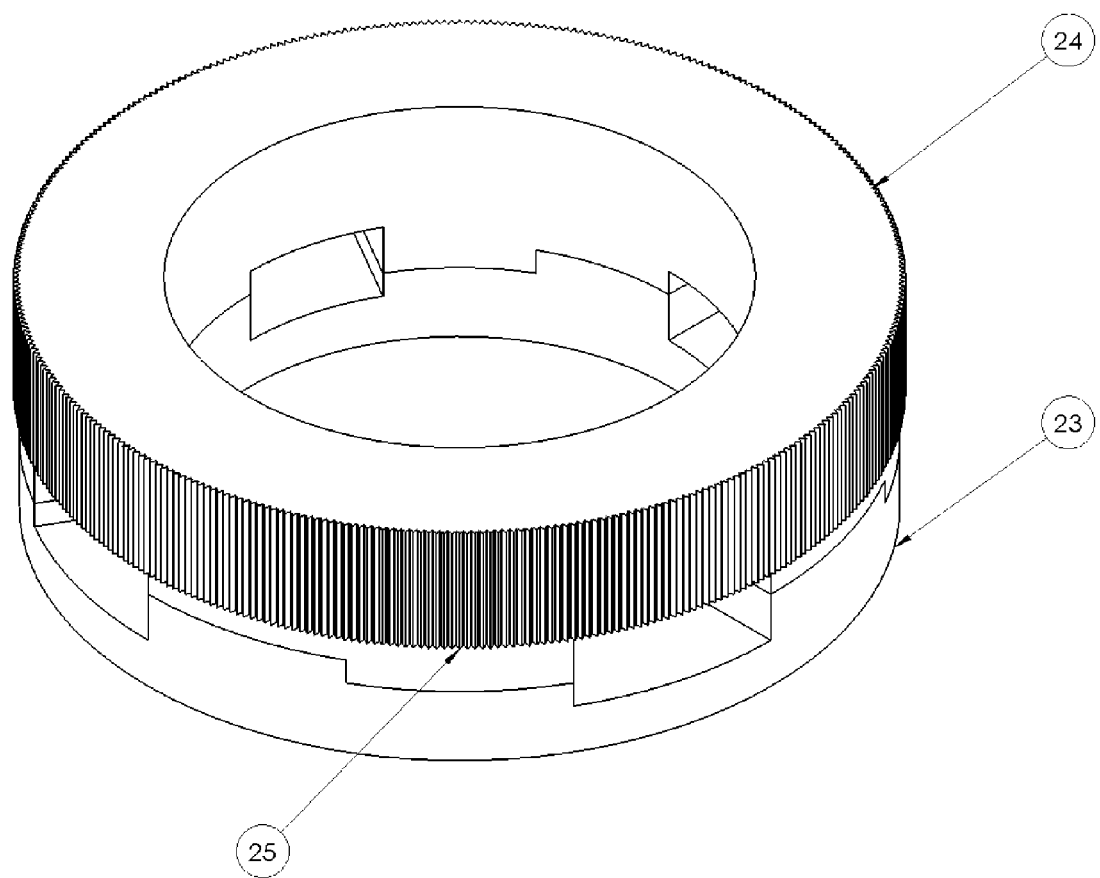
FIG. 26 is a top isometric view showing a load relief washer assembly according to an embodiment of the present invention with a splined feature on the top washer.
Figure 27:
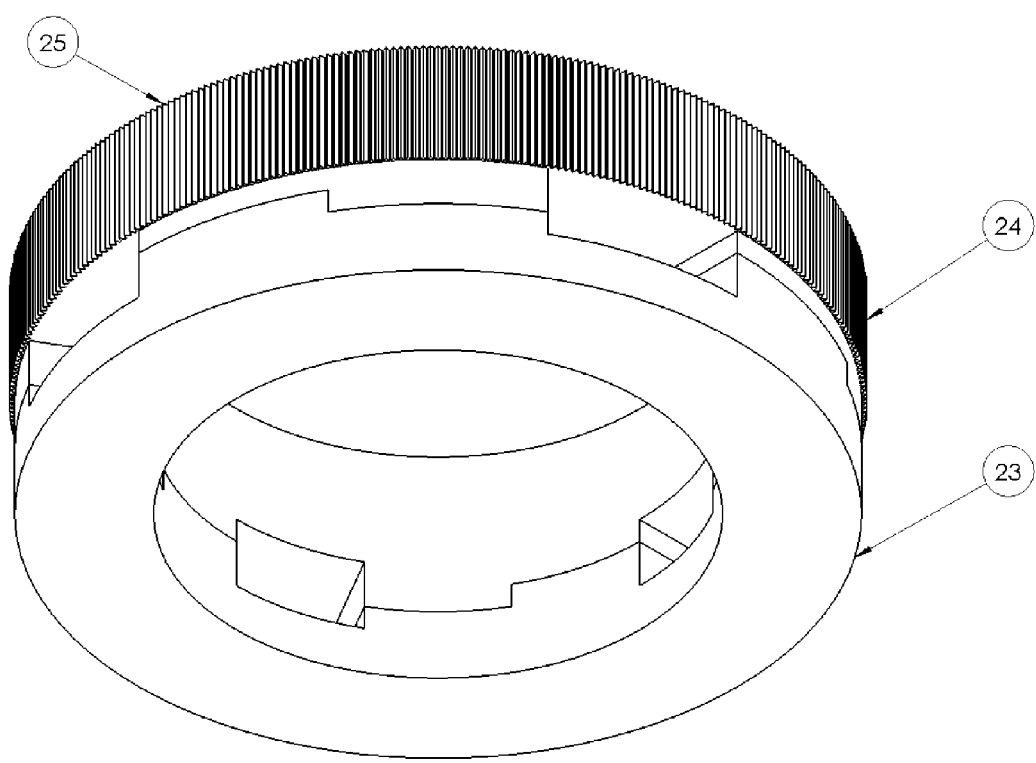
FIG. 27 is a bottom isometric view of FIG. 26 showing a load relief washer assembly with a splined feature on the top washer.
Figure 28:
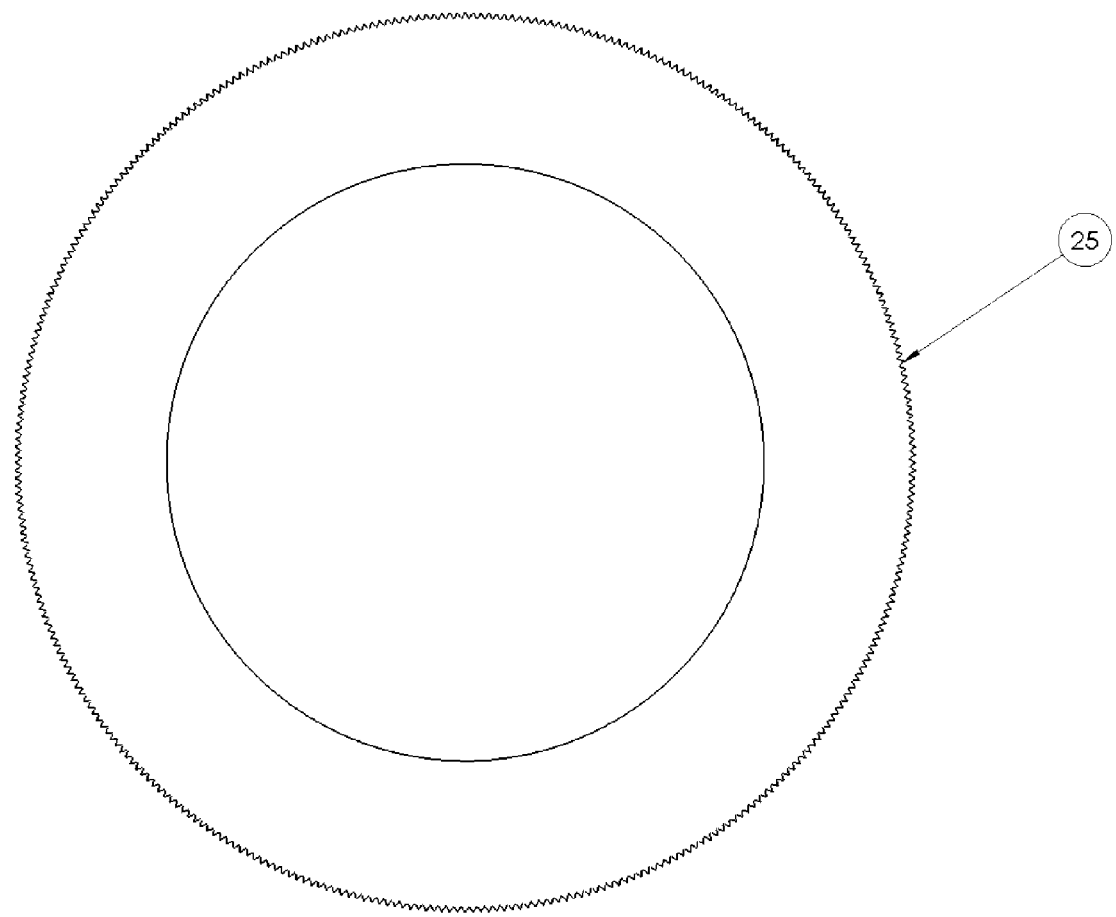
FIG. 28 is a top view of FIG. 26 showing a load relief washer assembly with a splined feature on the top washer.

There is provided another embodiment of the load relief washer assembly (FIGS. 26 to 28) comprising a lower washer piece (23), an upper washer piece (24) with a splined feature (25), a plurality of complimentary stepped features which comprise the mating surfaces of the lower washer (23) and the upper washer (24), and a plurality of sliding planes created by the interface of the lower washer (23) and the upper washer (24). The splined feature (25) is included to aid in achieving relative rotation of the lower washer (23) and the upper washer (24) though external means, such as a splined socket.

Figure 29:
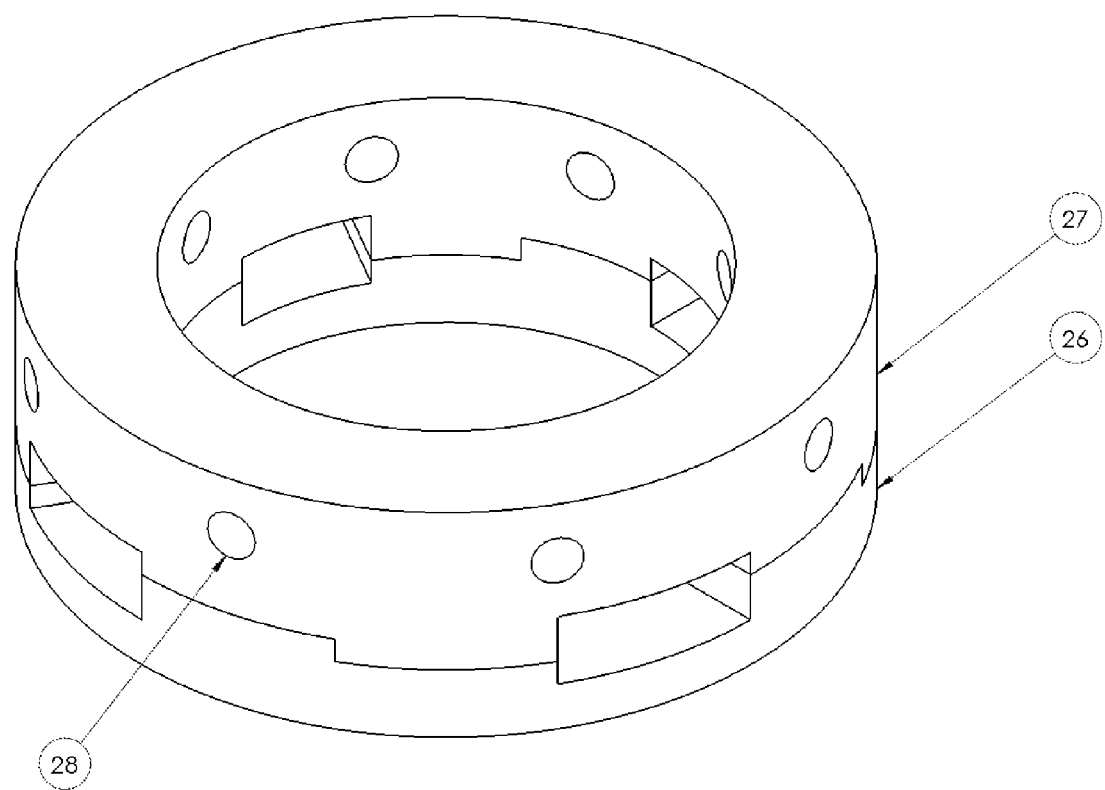
FIG. 29 is an isometric view showing a load relief washer assembly according to an embodiment of the present invention with transverse holes on the top washer.
Figure 30:
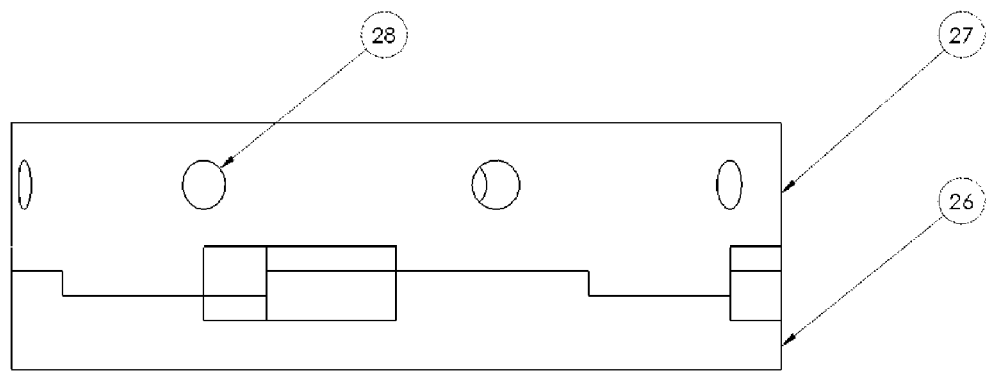
FIG. 30 is a side view of FIG. 29 showing a load relief washer assembly with transverse holes on the top washer.

There is provided another embodiment of the load relief washer assembly (FIGS. 29 to 30) comprising a lower washer piece (26), an upper washer piece (27) with a plurality of transverse holes (28), a plurality of complimentary stepped features which comprise the mating surfaces of the lower washer (26) and the upper washer (27), and a plurality of sliding planes created by the interface of the lower washer (26) and the upper washer (27). The transverse holes (28) are included to aid in achieving relative rotation of the lower washer (26) and the upper washer (27) though external means, such as a spanner wrench or tommy wrench.

Also, it is to be understood that even though hexagonal and other select features have been shown to aid in activation of the device, the use of other types of aids are also contemplated. For example, activation could be aided by rectangular, toothed, gear-like, or roughed features on the surface opposite the surface having the stepped features or the castellated features. Additionally, no supplementary activation aiding feature is necessary. Therefore, the present invention is not limited to a particular feature to aid in achieving relative rotation of the lower washer (1) and the upper washer (2).

Obviously, even if only some shapes of load relief washer assemblies have been shown and described, the skilled addressee will understand that the lower washer (1) and the upper washer (2) of the present invention could be provided in a variety of shapes and sizes according to the specific needs of a specific bolted assembly.

Thus, although preferred embodiments of the invention have been described in detail herein and illustrated in the accompanying figures, it is to be understood that the invention is not limited to these precise embodiments and that various changes and modifications may be effected therein without departing from the scope or spirit of the present invention.

The invention claimed is:
1. A load relief washer assembly for associated fasteners, comprising:
   a first body having a substantially annular shape with a through hole for an associated bolt or stud or threaded fastener to pass, and having a top surface and bottom surface, wherein the top surface has a plurality of stepped features or castellated features which form mating surfaces and a plurality of sliding planes;
   a second body having a substantially annular shape with a through hole for the associated bolt or stud or threaded fastener to pass, and having a top surface and bottom surface, wherein the bottom surface has a plurality of stepped features or castellated features which form mating surfaces and a plurality of sliding planes;
   wherein the stepped features or castellated features and the sliding planes of the first body and second body are complementary to one another; and
   wherein when the load relief washer is assembled with the associated bolt, stud, or threaded fastener, the first body may be rotated relative to the second body along the sliding planes, the stepped features or castellated features of the first body and the second body align allowing the first body and the second body to move toward one another which reduces an overall height of the load relief washer assembly; thereby reducing a tensile load to the associated bolt, stud, or threaded fastener.

2. The assembly as claimed in claim 1, wherein the first body and the second body each include four of the stepped features or castellated features and plurality of sliding planes.

3. The assembly as claimed in claim 1, wherein the first body and the second body each include eight of the stepped features or castellated features and a plurality of sliding planes.

4. The assembly as claimed in claim 1, wherein the substantially annular shape first body is dodecagonal.

5. The assembly as claimed in claim 1, wherein the substantially annular shape first body further comprises splines along an outer perimeter to assist with rotating the first body relative to the second body.

6. The assembly as claimed in claim 1, wherein the substantially annular shape first body further comprises a plurality of transverse holes.

7. The assembly as claimed in claim 1, wherein the first body further comprises a geometric feature on the surface opposite the surface having the stepped feature or castellated feature to aid in or inhibit rotation of the first body.

8. The assembly as claimed in claim 1, wherein the second body further comprises a geometric feature on the surface opposite the surface having the stepped feature or castellated feature to aid in or inhibit rotation of the second body.

9. The assembly as claimed in claim 1, wherein the first body further comprises a surface finish on the surface opposite the surface having the stepped feature or castellated feature to aid in or inhibit rotation of the first body.

10. The assembly as claimed in claim 1, wherein the second body further comprises a surface finish on the surface opposite the surface having the stepped feature or castellated feature to aid in or inhibit rotation of the second body.

\* \* \* \* \*